United States Patent
Hoffman et al.

[11] Patent Number: 6,152,578
[45] Date of Patent: Nov. 28, 2000

[54] MOUNTING ASSEMBLY FOR A LIGHT CONDUIT LIGHTING SYSTEM

[75] Inventors: Joseph A. Hoffman, Minneapolis; DuWayne C. Radke; Ken J. Hagen, both of Woodbury, all of Minn.

[73] Assignee: 3M Innovative Properties Company, St. Paul, Minn.

[21] Appl. No.: 09/249,364

[22] Filed: Feb. 12, 1999

Related U.S. Application Data

[63] Continuation-in-part of application No. 09/060,552, Apr. 15, 1998.

[51] Int. Cl.[7] .................................................. F21V 21/29
[52] U.S. Cl. ......................... 362/285; 362/147; 362/277; 362/371; 362/404; 362/418
[58] Field of Search ................................. 362/287, 277, 362/285, 147, 432, 368, 370, 371, 404, 418, 408

[56] References Cited

U.S. PATENT DOCUMENTS

| | | |
|---|---|---|
| 4,260,220 | 4/1981 | Whitehead . |
| 4,580,552 | 4/1986 | Nishioka et al. . |
| 4,615,579 | 10/1986 | Whitehead . |
| 4,731,710 | 3/1988 | Distasio ................................. 362/147 |
| 4,750,798 | 6/1988 | Whitehead . |
| 4,768,858 | 9/1988 | Hussein . |
| 4,787,708 | 11/1988 | Whitehead . |
| 4,805,984 | 2/1989 | Cobb, Jr. . |
| 4,834,495 | 5/1989 | Whitehead et al. . |
| 4,906,070 | 3/1990 | Cobb, Jr. . |
| 5,056,892 | 10/1991 | Cobb, Jr. . |
| 5,154,509 | 10/1992 | Wulfman et al. ...................... 362/226 |
| 5,309,544 | 5/1994 | Saxe . |
| 5,339,382 | 8/1994 | Whitehead . |
| 5,363,470 | 11/1994 | Wortman . |
| 5,475,785 | 12/1995 | Johanson . |
| 5,481,637 | 1/1996 | Whitehead . |
| 5,483,119 | 1/1996 | Johanson . |
| 5,661,839 | 8/1997 | Whitehead . |
| 5,672,003 | 9/1997 | Shemitz et al. ......................... 362/396 |
| 5,702,177 | 12/1997 | Lin ......................................... 362/226 |
| 5,715,347 | 2/1998 | Whitehead . |
| 5,784,517 | 7/1998 | Johanson . |

FOREIGN PATENT DOCUMENTS

| | | |
|---|---|---|
| 0 235 447 | 11/1986 | European Pat. Off. . |
| 0 401 711 | 6/1990 | European Pat. Off. . |
| 0 446 692 | 2/1991 | European Pat. Off. . |
| 42 03 107 | 2/1992 | Germany . |
| 196 40 324 | 9/1996 | Germany . |
| 196 40 325 | 9/1996 | Germany . |
| 2 269 911 | 8/1992 | United Kingdom . |
| WO 97/24553 | 12/1996 | WIPO . |

*Primary Examiner*—Thomas M. Sember
*Assistant Examiner*—John Anthony Ward
*Attorney, Agent, or Firm*—David B. Patchett

[57] ABSTRACT

A mounting assembly for mounting a light pipe lighting system on a support surface includes an elongate support rail connect to the light source and a hanger bracket connect to the elongate support rail. The support rail includes oppositely extending longitudinal flange portions which slidably engage the hanger bracket and thereby serve to connect the support rail with the hanger bracket. The hanger bracket can be either slidably supported on the support rail to allow the light source to move relative to the support surface or the hanger bracket can be fixed at various locations along the support rail. The elongate light source support rail is connect to the light source with a bracket or with a casing which encloses the light source, and the light source support rail can be further connected with an associated light pipe support rail to transmit axial forces between the light pipe and light source.

24 Claims, 8 Drawing Sheets

MOUNTING ASSEMBLY FOR A LIGHT CONDUIT LIGHTING SYSTEM

The present application is a continuation-in-part of U.S. patent Ser. No. 09/060,552 entitled Mounting Assembly for a Light Conduit Lighting System, filed Apr. 15, 1998.

FIELD OF THE INVENTION

The present invention relates to lighting systems and, more particularly, to a mounting system for a light conduit lighting system which allows a light source to be either slidably or fixedly mounted to a support surface.

BACKGROUND OF THE INVENTION

The illumination of a large area by a central lighting system has long been desired because of its many advantages. For example, a centralized light source is easier to maintain than many distributed light sources. Heat generated by a centralized light source can be easily vented from the lighted areas, whereas heat from distributed light sources is not easily vented. A light distribution system connected to a centralized light source radiates minimal or no heat.

Light pipes or light conduits made of a transparent material having substantially planar inner surfaces and outer surfaces which are "in octature" have been utilized to transport light, as illustrated in U.S. Pat. No. 4,260,220 to Whitehead. These devices are typically constructed of an optical lighting film made of flexible polymeric sheets of a transparent material having a structured surface on one side and a smooth surface opposite the structured surface. The structured surface of the devices preferably includes a linear array of miniature substantially right angle isosceles prisms arranged side-by-side to form a plurality of peaks and grooves. Further, the perpendicular sides of the prisms make an angle of approximately 45 degrees with the smoother surface. This structure of the polymeric sheets, as well as the shape of the light conduit, enables light to be constrained to travel through the light conduit without escaping through its walls if the angle by which the light rays deviate from the longitudinal axis of the light conduit does not exceed a critical angle. Thus, light entering a light conduit at an angle less than the critical angle is totally internally reflected.

The critical angle is defined as the arc sine of the ratio of the index of refraction of the surrounding medium (typically air) to that of the wall material. For example, for a transparent material of polymethylmethacrylate having a refractive index of 1.493, all incident light rays less than the critical angle of about 27.3 degree, as measured along the longitudinal axis of the light conduit, will be totally internally reflected. On the other hand, incident light that enters the light conduit outside the critical angle will not be totally internally reflected.

Alternatively, a light conduit can be constructed using a multi-layer optical film, such as disclosed in U.S. Pat. No. 5,661, 839 (Whitehead). Light conduits have been constructed with various cross-sections, such as square cross-sections as illustrated in U.S. Pat. No. 4,260,220, and circular cross-sections, as illustrated in U.S. Pat. No. 4,805, 984.

In many applications, it is desirable to allow the light to escape from the light conduit in a controlled manner. Many means for facilitating emission of light from the light conduit have been used in the past, such as disclosed in U.S. Pat. No. 5,363,470 (Wortman). In another example, an extractor such as a diffuse scatterer made of a highly reflective white polymeric tape such as SCOTCHCAL ELECTROCUT brand film, manufactured by Minnesota Mining and Manufacturing Company, St. Paul, Minn., can be placed inside a light conduit to increase the rate of leakage, or emission, of the light from inside the light conduit. The diffuse scatterer increases the rate of leakage by "scattering" light that hits it into non-total internal reflecting angular regions of the light conduit, thereby increasing the amount of light in those angles which allow light to be emitted from the light conduit. Typically, a strip of the highly reflective while polymeric tape is placed over the length of the light conduit to cause the scattering.

Current light distribution systems utilize segmented light conduits attached to a light source. The light conduit segments are joined to form a chain which can have an overall length between 4 and 40 meters. A light distribution system can include a single light source provided at one end of the chain or include light sources at each end, which are directed toward each other. Light distribution systems are subjected to various forces including tension and compression forces produced by thermal contraction and expansion, respectively, which accompany temperature fluctuations. A 40-meter light conduit chain can expand and contract by as much as 15 centimeters. Accordingly, light distribution systems must be designed to withstand the forces produced by such changes in length. In current installations, the light source is typically attached to a wall or ceiling at a fixed location. As such, the light source cannot move to relieve stresses in the light distribution system and the location cannot be easily changed after installation. In addition, for a two-light system in which one of the light sources must be permitted to move relative to the other, installation requires two separate light source mounting assemblies. It would therefore be desirable to provide a mounting assembly for light sources which eliminates the need for separate mounting assemblies, and which is easy to install.

BRIEF SUMMARY OF THE INVENTION

The present invention provides a mounting assembly for mounting a light conduit lighting system to a support surface, such as a ceiling. The mounting assembly includes an elongate support rail connected with the light source and a hanger bracket connected with the elongate support rail. The support rail includes oppositely extending longitudinal flange portions which slidably engage the hanger bracket and thereby serve to connect the support rail with the hanger bracket. The hanger bracket can be either slidably supported on the support rail to allow the light source to move relative to the support surface, or the hanger bracket can be fixed at various locations along the support rail. Such a mounting assembly is particularly desirable for use with a two-light lighting system in which two light sources directed toward each other are provided on opposite ends of a light conduit, such as a light pipe. In such a system, one light source is typically fixed to the support surface while the other light source is permitted to float or move relative to the support surface and the fixed light source. Accordingly, stresses produced in the system as a result of, for example, thermal expansion or contraction are eliminated. Such a system also facilitates installation by permitting the light source to be mounted at different locations on the support surface.

In one embodiment, the light pipe includes a support rail which is connected with the light source support rail so that all axial tensile and compressive forces are transmitted through the support rails. The light source support rail is connected with the light source with a housing bracket, and to prevent relative movement between the hanger bracket and housing bracket, the hanger bracket can be rigidly connected with the housing bracket. To restrict longitudinal movement of the hanger bracket on the support rail in instances where the hanger bracket is not fixedly connected with the housing bracket, the support rail is provided with a pair of stops on opposite sides of the hanger bracket which engage the hanger bracket when the support rail slides a predetermined distance relative to the hanger bracket.

In another embodiment, the light source support rail is connected with a casing which encloses the light source, and the light source support rail is not connected with the light pipe support rail, whereby axial forces are transmitted directly from the light pipe to the light source. A load-bearing coupling can be provided between the light pipe and light source to transmit the forces more effectively. In addition the adjacent ends of the light pipe and coupling can include interlocking collars which transmit the tensile and compressive forces.

In one embodiment, the hanger brackets include opposing side portions each having end portions that can be flexed apart to permit engagement with the first support rail and a restraining member defining a maximum separation between the end portions whereby the first support rail is retained by the end portions. The restraining member can be a wire structure extending around outside surfaces of the side portions or a variety of other structures. The support rails and hanger brackets used with the light source and light conduits may be the same or different.

The present invention is also directed to a light conduit lighting system utilizing the mounting assembly. The light conduit lighting system includes a light source, a coupling connected to the light source, a light conduit assembly including at least one light conduit connected to the coupling, at least one elongate support rail connected to the light source and the light conduit assembly, at least one hanger bracket connected to the elongate support rail proximate the light source, and at least one hanger bracket slidably connected to each support rail proximate the light conduit assembly.

BRIEF DESCRIPTION OF THE SEVERAL VIEW OF THE DRAWING

The present invention will be further described with reference to the accompanying drawings, wherein like reference numerals refer to like parts in the several views, in which.

DETAILED DESCRIPTION OF THE INVENTION

Figure 1:
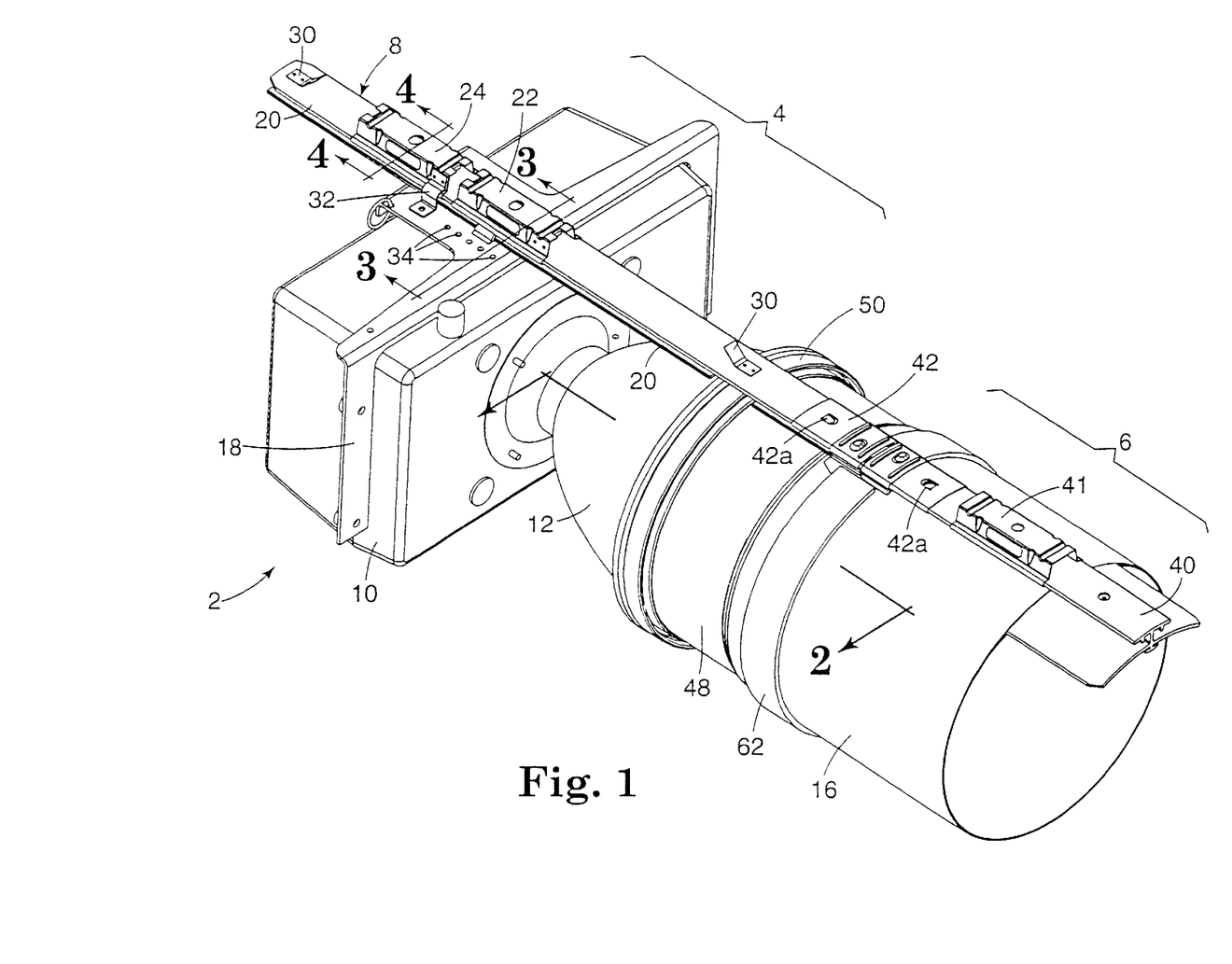
FIG. 1 is a perspective view of a lighting system incorporating the mounting assembly in accordance with the present invention.
Figure 2:
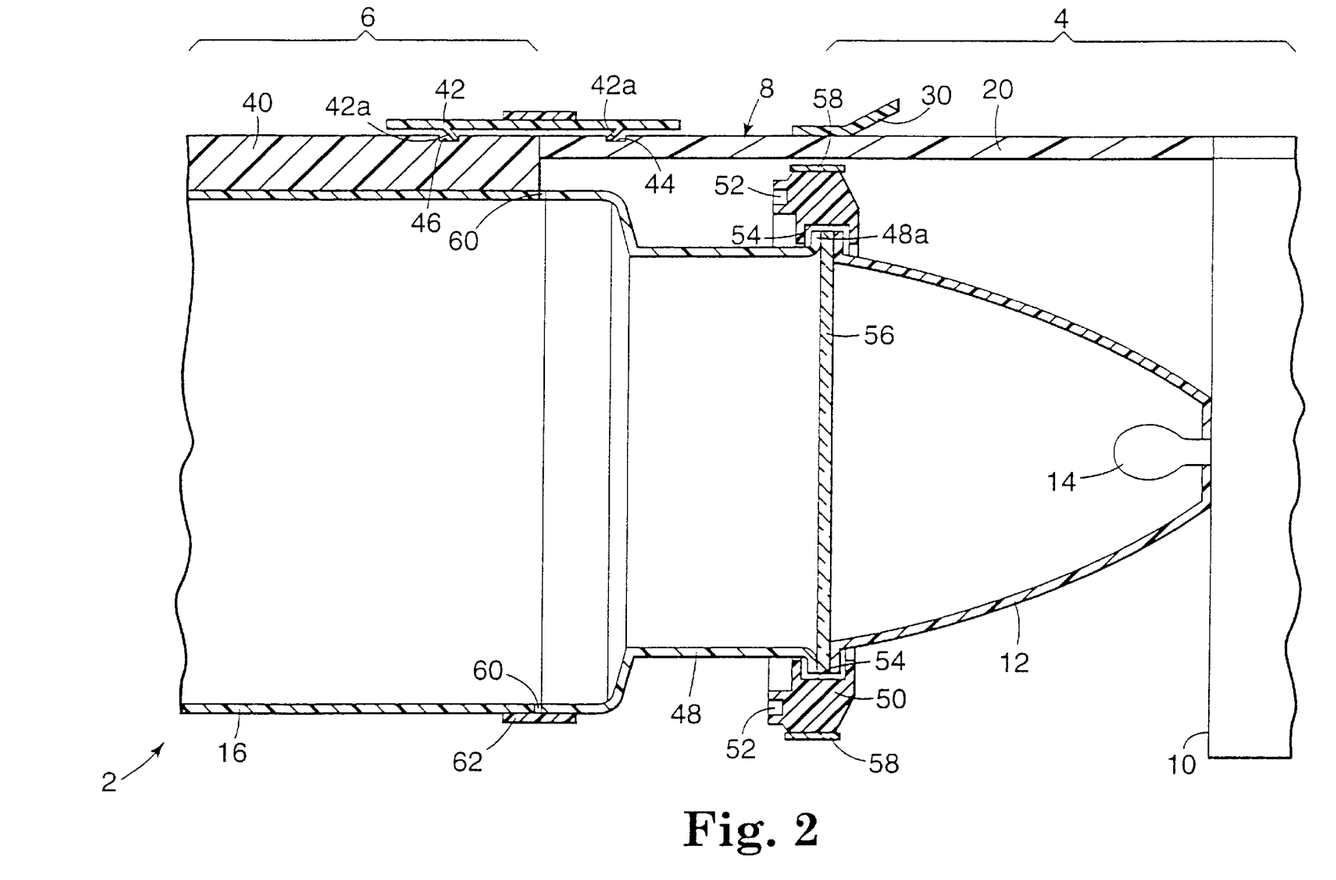
FIG. 2 is a longitudinal cross-sectional view of the lighting system of FIG. 1.

Referring now to FIG. 1 and 2, there is shown a lighting system 2 including a light source 4, a light conduit 6, such as a light pipe assembly, and a mounting assembly 8 for hanging the lighting system 2 from a support surface 21 (see FIG. 3), such as a ceiling. For simplicity, the lighting system is shown with a single light source. However, the lighting system can include a second light source arranged on the remote end of the light pipe assembly directed toward the first light source, thereby allowing the overall length of the lighting system to be increased. The light source is intended to represent a high intensity light source such as a metal halide lamp or an electrode-less bulb, for example, a sulfur lamp. The light source includes a housing 10, and a reflector cone 12 containing a light bulb 14. The light pipe assembly, such as the 3M LPS 1010 light pipe system available from Minnesota Mining and Manufacturing Company, St. Paul, Minn., includes a plurality of interconnected light pipes 16. For simplicity, only one such light pipe is shown. In one embodiment, the light pipe 16 includes a separate optical light film located on an inner surface of an outer shell constructed from a clear polymeric materials, such as polycarbonate.

Figure 3:
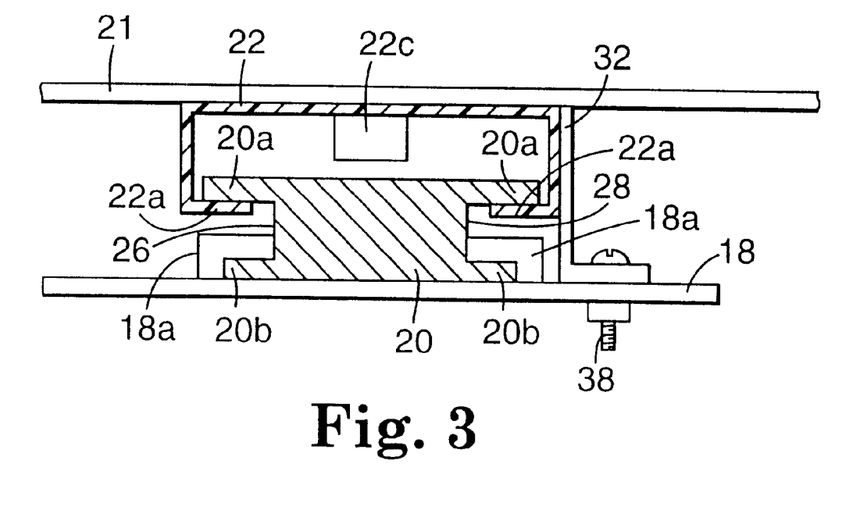
FIG. 3 is a cross-sectional view taken along line 3—3 of FIG. 1.
Figure 4:
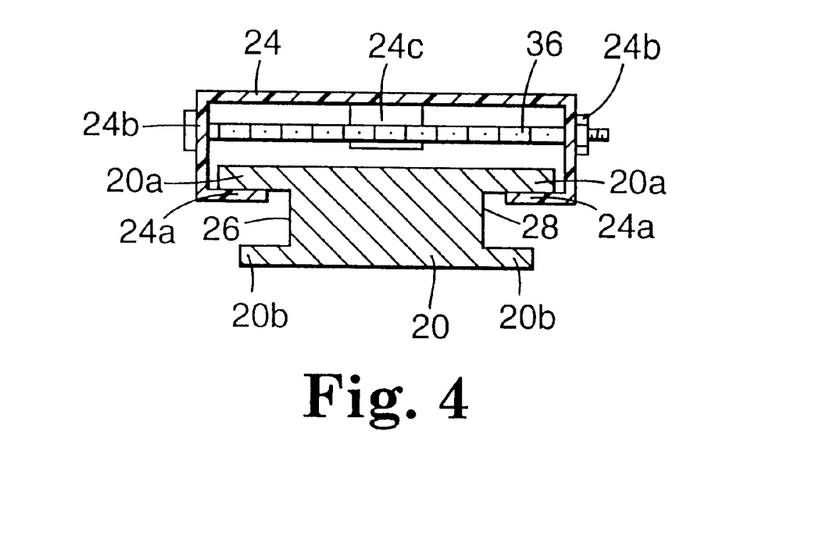
FIG. 4 is a cross-sectional view taken along line 4—4 of FIG. 1.

The mounting assembly includes a main housing bracket 18 connected with the light housing 10, an elongated light source support rail 20 fixedly connected with the housing bracket 18, and a pair of hanger brackets 22, 24 connected with the support rail 20. The hanger brackets 22, 24 are fixedly connected with the support surface, such as a ceiling. Alternatively, the support rail can be fixedly connected with the support surface and the hanger brackets can be fixedly connected with the housing bracket, whereby the hanger brackets would be able to slide along the fixed support rail. FIGS. 3 and 4 show the connection between the support rail 20 and the hanger brackets 22 and 24, respectively. The support rail 20 has a generally I-shaped cross-section and includes a pair of oppositely extending upper flange portions 20a and a pair of oppositely extending lower flange portions 20b which together with upper flange portions 20a define a pair of longitudinally extending channels 26 and 28 which receive inwardly directed angled portions 22a, 24a of the hanger brackets 22, 24, respectively. The angled portions 22a, 24a are slidably retained within the channels 26, 28, thereby allowing the support rail 20 and an associated light source to be slid onto the brackets 22, 24 during installation and further allowing the support rail and the associated light source to slide through the brackets and therefore move relative to the support surface when the length of the light pipe assembly 6 changes due to thermal expansion and contraction. Housing bracket shoulder portions 18a engage the lower flange portions 20b and connect the housing bracket 18 with the support rail 20.

A pair of stops 30 extend upwardly from the support rail 20 in the direction of and on opposite sides of the hanger brackets 22, 24. The stops 30 serve to limit the extent of travel between the hanger brackets 22, 24 and the support rail 20. Accordingly, when the support rail 20 and the light source 4 move a predetermined distance relative to the hanger brackets 22, 24 which are fixed to the support surface, the hanger brackets 22, 24 engage the stops 30 which prevent the support rail 20 from sliding any farther. Alternatively, a locking tab 32 can be connected with the hanger bracket 22 and the housing bracket 18 to fixedly connect the hanger bracket 22 with the support rail 20, and thereby prevent the support rail 20 from sliding relative to the bracket 22. Since the hanger bracket 22 is fixed to the support surface, the locking tab serves to lock the light source 4 in a fixed position relative the support surface. A similar locking tab can also be provided with hanger bracket 24 to provide additional means for maintaining the light source and light source support rail in a fixed position relative to the support surface. Other known fastener techniques, such as welding or riveting, can also be used to connect the hanger brackets with the support rail. Alternatively, the locking tabs can be removed, thereby allowing the light source support rail 20 and the light source mounted thereon to slide through the hanger brackets 22, 24 and thus move relative to the support surface as described above. Allowing the light source to move facilitates installation, and is desirable to relieve stresses which would otherwise be created in the light system due to relative movement between the light source and light pipe assembly such as those stresses caused by changes in length resulting from thermal expansion and contraction of the light pipe assembly 6. Thus, the mounting assembly of the present invention can be used to mount a light source in either a fixed position relative to the support surface or slidably mount the light source relative to the support surface. Such a mounting assembly is particularly desirable in a two light system in which one light source is fixed and the other light source is free to move relative to the hanger brackets.

The housing bracket 18 and the locking tab 32 are connected by inserting a fastener 38, such as a nut and bolt, through the locking tab 32 and through one of a plurality of aligned holes 34 provided in the housing bracket 18. Hanger bracket 24 includes a screw clamp 36 which extends between side wall portions 24b of the bracket. When tightened, the screw clamp 36 exerts an inward force which urges the side wall portions 24b together, thereby providing added structural integrity to the bracket 24 which prevents the hanger bracket from disconnecting from the support rail. Bracket 22 can also include a screw clamp. Other known techniques, such as providing a rigid bar between the side walls 24b, can also be used to prevent the side walls 24b from separating. Each bracket 22, 24 also includes a tang 22c, 24c, respectively, which extends downwardly toward the support rail 20 and engages one of the stops 30 if the light source slides a predetermined distance along the support rail 20 as described above.

Each light pipe 16 includes a support rail 40 which extends along the length of the light pipe. A light pipe hanger bracket 41, similar to the light source hanger brackets 22, 24, is mounted to the support surface and slidably engages the light pipe support rail 40, thereby allowing the light pipe 16 and light pipe support rail 40 to move relative to the support surface in response to changes in the overall length of the light pipe assembly 6 caused by, for example, thermal expansion and contraction. A connector or guide clip 42 connects the light source support rail 20 with the light pipe support rail 40. The guide clip includes a pair of projections 42a which engage notches 44, 46 contained in the light source support rail 20 and light pipe support rail 40, respectively, which prevent the support rails from becoming separated. Thus, during contraction of the light pipe assembly, a tensile force is transmitted through the guide clip, and during expansion, a compressive force is transmitted through the guide clip. Alternatively, during expansion, the ends of the light source support rail 20, the light pipe support rail can abut, and the compressive force will be transmitted through the support rails.

A coupling 48 connects the light pipe 16 with the reflector cone 12. Additional details of the coupling 48 are described in commonly assigned U.S. patent application entitled Thermally Protective Coupling for a Light Conduit System, U.S. patent Ser. No. 09/060,558, filed Apr. 15, 1998. A coupling gasket 50 connects the coupling 48 with the reflector cone 12. The coupling gasket 50 includes an annular transversely extending groove 52 which receives the end of the light pipe 16 if the coupling 48 is not used and the light pipe 16 is connected directly with the reflector cone 12. The coupling gasket 50 also includes a radially inwardly directed groove 54 which receives the edge of the reflector cone 12, the edge of a transparent cover 56 for the reflector cone 12, and a lip portion 48a of the coupling 48. A V-band clamp 58 arranged around coupling gasket 50 is used to tighten the coupling gasket connection. An annular gasket 60 is provided between the light pipe 16 and the coupling 48 to produce a tight seal therebetween. In addition, a strap 62 extends around the joint formed by the light pipe 16, the annular gasket 60, and the coupling 48 to provide added support for the connection and to provide a more effective seal. The strap 62 is secured to the outer surface of the guide clip 42. Alternatively, the strap 62 can be fastened to the support rails 20, 40, the coupling 26, or the light pipe 16.

Figure 5:
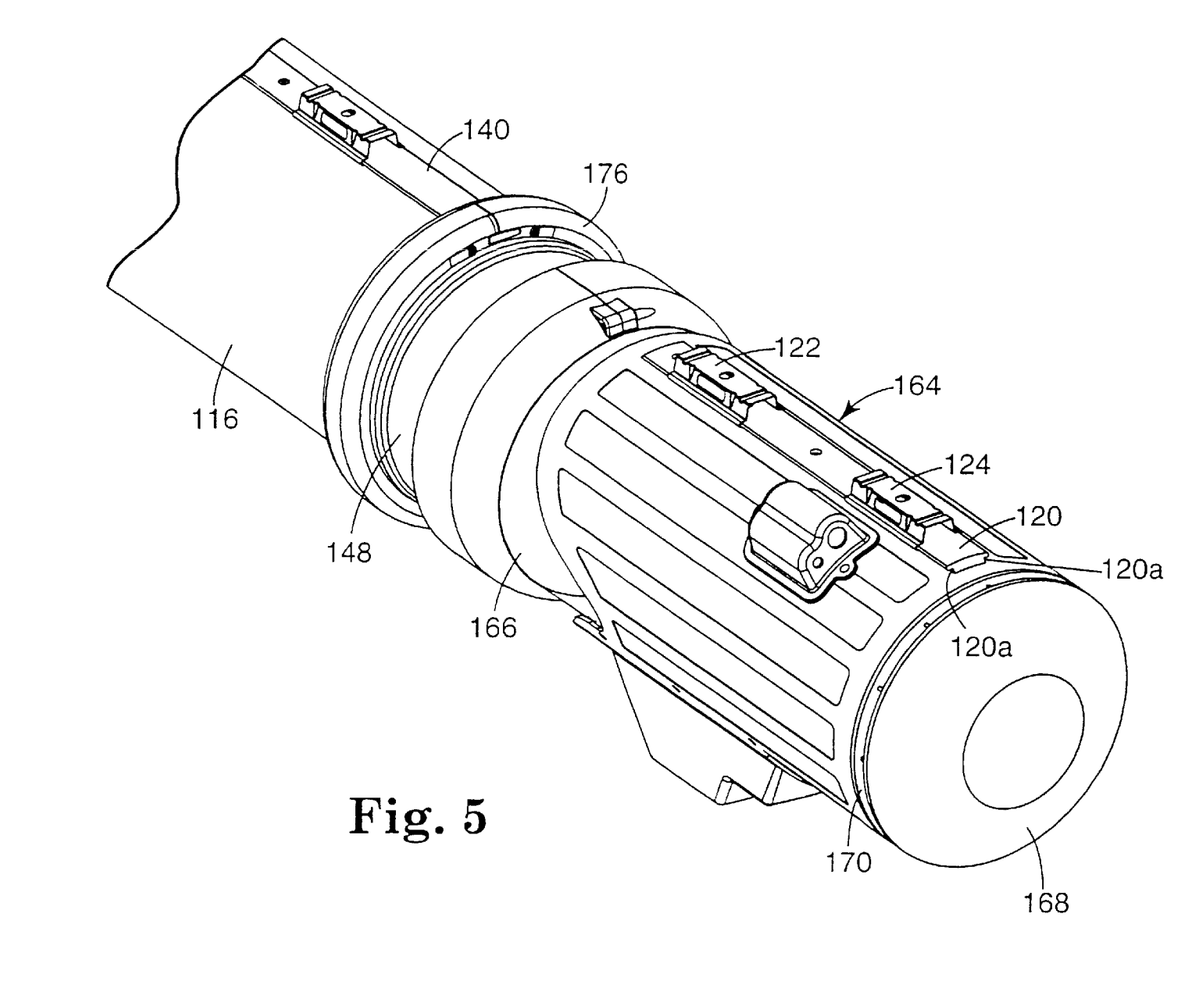
FIG. 5 is a perspective view of an alternate embodiment of the invention.
Figure 6:
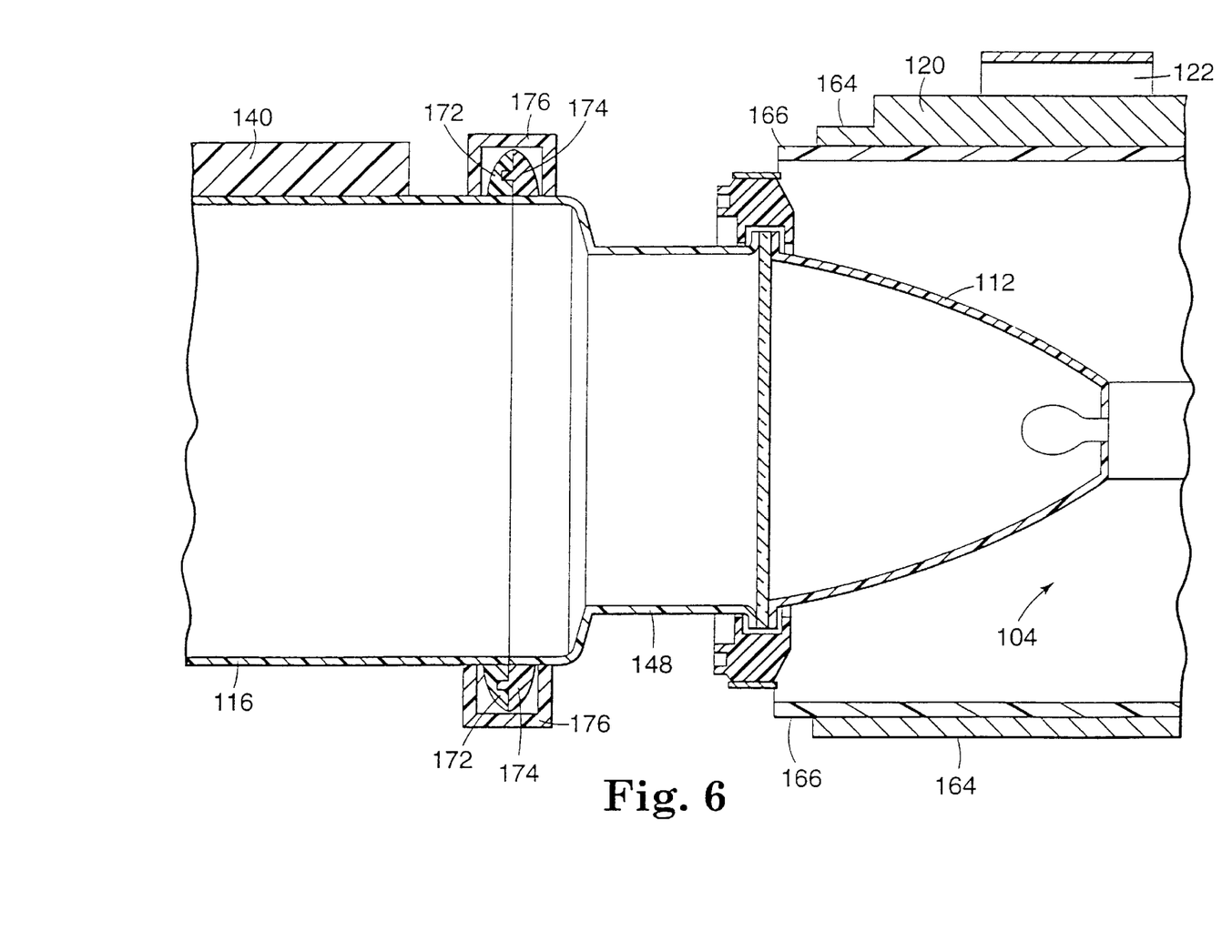
FIG. 6 is a longitudinal cross-sectional view of the embodiment of FIG. 5.
Figure 7:
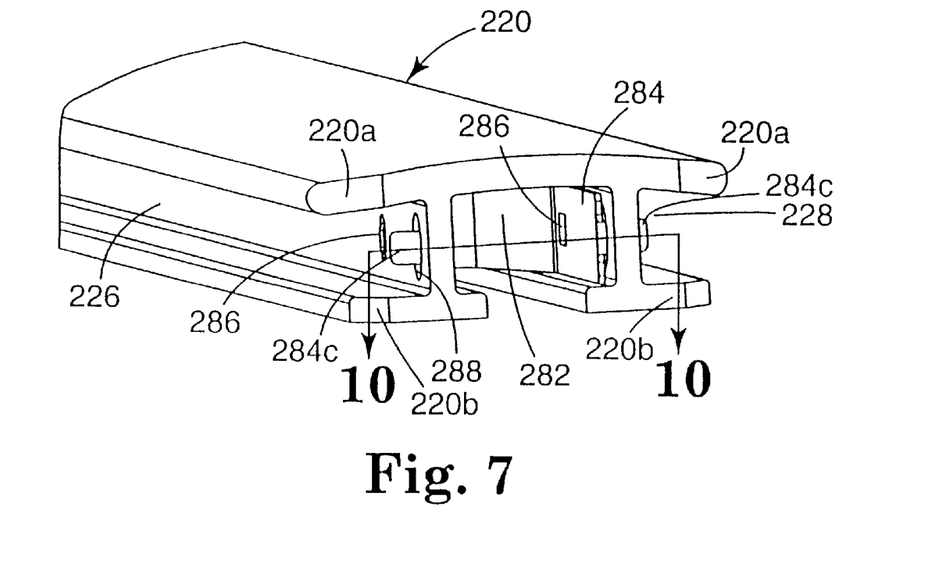
FIG. 7 is a perspective view of an alternate support rail in accordance with the present invention.

FIGS. 5 and 6 show an alternate embodiment of the mounting assembly according to the invention. The mounting assembly includes a shell or casing 164 which receives the chassis 166 of the light source 104. The chassis 166 contains the reflector cone 112 and the light source housing (not shown). The casing serves to enclose and therefore protect the chassis 166, and further serves to support the light source from the support surface in a manner similar to the main housing bracket 18 described in reference to FIGS. 1 and 2. An elongated support rail 120 is formed integrally with and extends along the top surface of the casing 164. Additional features of the casing 164 are shown in a commonly assigned U.S. design patent application entitled Lighting Fixture, U.S. design patent Ser. No. 29/086,534. filed Apr. 15, 1998. Alternatively, the support rail 120 can be a separate component which is attached to the casing 164. The support rail 120 includes a pair of oppositely extending flange portions 120a which are slidably engaged by the angled portions of the hanger brackets 122 and 124 in a manner similar to that of hanger brackets 22 and 24 engaging support rail 20 shown in FIGS. 3 and 4. The casing includes an end cap 168 which is connected with and spaced from the shell, thereby defining an annular air flow slot 170 which allows cooling air to enter the casing and flow through the chassis 166. While the casing 164 is shown as having a generally circular cross-section, it will be recognized that the casing can have various cross-sections, such as square or rectangular. In addition, the casing can be formed as one component having an open end into which the light source is inserted, or formed as two halves which are fastened together around the light source.

In contrast to the mounting assembly of FIGS. 1 and 2, the light source support rail 120 of FIGS. 5 and 6 is not connected with the light pipe support rail 140. Rather, the entire length of the light source support rail 140 is contained within the length of the casing 164. Thus, the guide clip 42 is eliminated. Without connecting the support rails 120 and 140, however, tensile and compression forces are transmitted from the light pipe 116 to the reflector cone 112 through the load bearing coupling 148. Since the connection between the light pipe 16 and coupling 48 described in reference to FIGS. 1 and 2 is not suited to transmit tensile forces, FIGS. 5 and 6 show an alternate connection between the coupling 148 and light pipe 116 which serves to transmit both tensile and compressive forces. The connection includes mating interlocking collars 172, 174 on adjacent ends of the light pipe 116 and the coupling 148. Another coupling system is described in commonly assigned U.S. patent application entitled Coupling System for a Light Conduit, U.S. patent Ser. No. 09/060,727 filed on Apr. 15, 1998 and U.S. patent application entitled Coupling System for a Light Conduit, filed on the same date herewith. A clamp 176 encloses the collars. Alternatively, the light pipe 116 can be connected directly to the coupling gasket 150, whereby the coupling 148 is eliminated.

FIGS. 7–10 show an alternate mounting assembly including a light source support rail 220, a hanger bracket 222, and a U-shaped stop clip 284. An advantage of this mounting assembly is that the stops 30, locking tab 32, and holes 34 shown in the embodiment of FIGS. 1 and 2 are eliminated. The support rail 220 contains a longitudinal interior channel 282 which receives the stop clip, and includes oppositely extending upper flange portions 220a and oppositely extending lower flange portions 220b which define longitudinally extending side channels 226, 228. The lower flange portions 220b are engaged by a shoulder portion 218a of the housing bracket 218, thereby securing the support rail 220 to the housing bracket 218. The hanger bracket 222 includes a U-shaped slide portion 222a (FIG. 9) which defines a channel which receives the upper flange portion 220a of the support rail 220. The hanger bracket 222 further includes a downwardly extending end portion 222b arranged adjacent the support rail 220 between the upper 220a and lower 220b flange portions. While only one half of the hanger bracket 222 has been shown and described, it will be apparent that the other half includes similar features.

Figure 8:
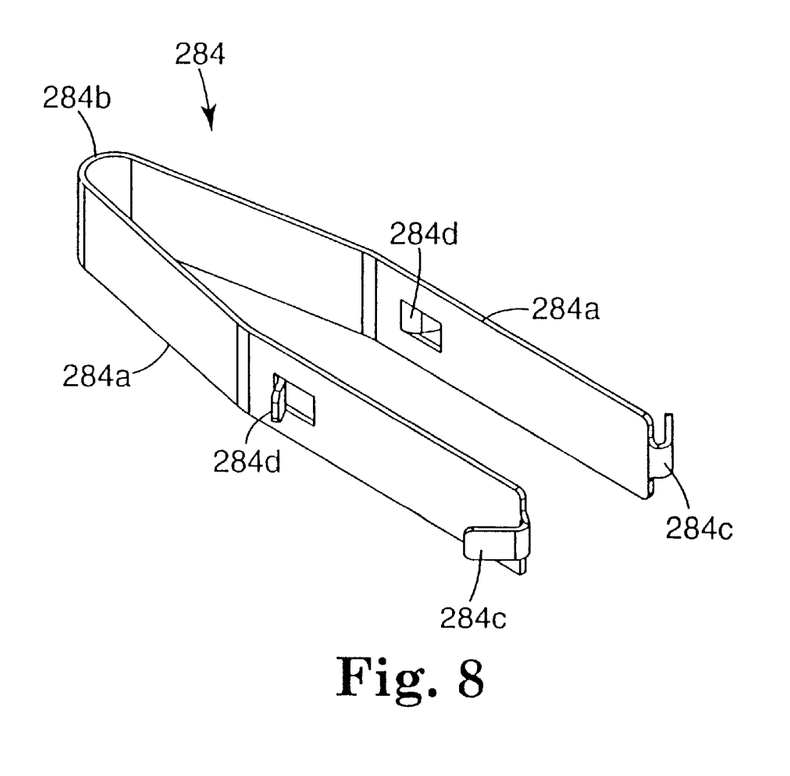
FIG. 8 is a perspective view of a stop clip in accordance with the present invention.
Figure 9:
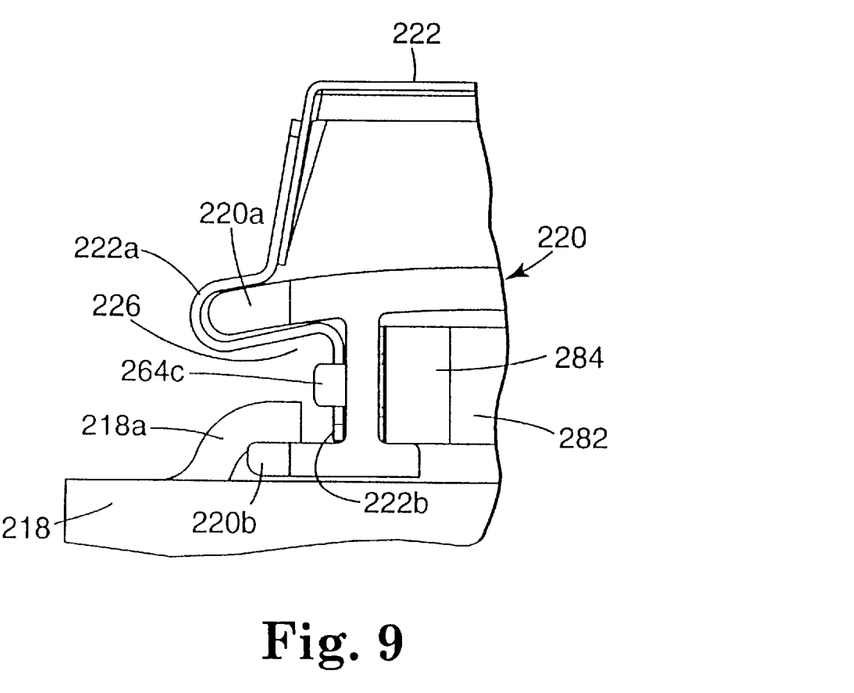
FIG. 9 is an end view of the support rail of FIG. 7 connected with a hanger bracket and housing bracket.
Figure 10:
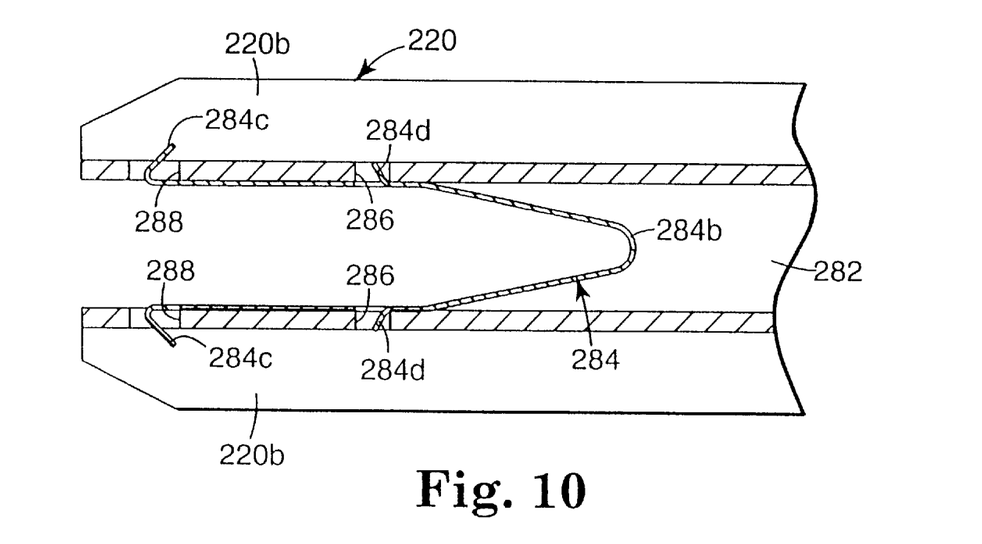
FIG. 10 is a cross-sectional view taken along line 10—10 of FIG. 7.

As shown most clearly in FIG. 8, the stop clip 284 includes a pair of legs 284a which are joined by and extend from an arcuate hinge portion 284b. The stop clip is formed of a suitable resilient material, such as spring steel. A pair of wing portions 284c extend outwardly in opposite directions from terminal ends of the each leg 284a, and a pair of locking tab portions 284d extend outwardly in opposite directions from the sides of each leg intermediate the hinge portion 284b and each wing portion 284c. The support rail 220 contains a first pair of transverse openings 286 which receive the locking tab portions 284d, and a second pair of transverse openings 288 proximate the end of the support rail 220 which receive the wing portions 284c. The openings 286, 288 allow the stop clip 284 to be slid into the interior channel 282 and locked into place. When inserted into the interior channel 282, an end of each wing portion 284c extends through its respective opening 288 and into side channel 226 beyond hanger end portion 222b. Thus, when the support rail 220 and the stop clip 284 are displaced relative to the hanger bracket 222, wing portion 284c will abut the downwardly extending end portion 222b of the hanger which will prevent the support rail and the associated light source from moving any farther. In this way, the stop clips 284 replace the stop members 30 shown in FIGS. 1 and 2. In addition, pairs of stop clips can be provided within the support rail channel 282 adjacent each side of the support hanger 222 to effectively lock the hanger in place, thereby eliminating the need for the locking tab 32 and the aligned holes 34 shown in FIGS. 1 and 2.

Figure 11:
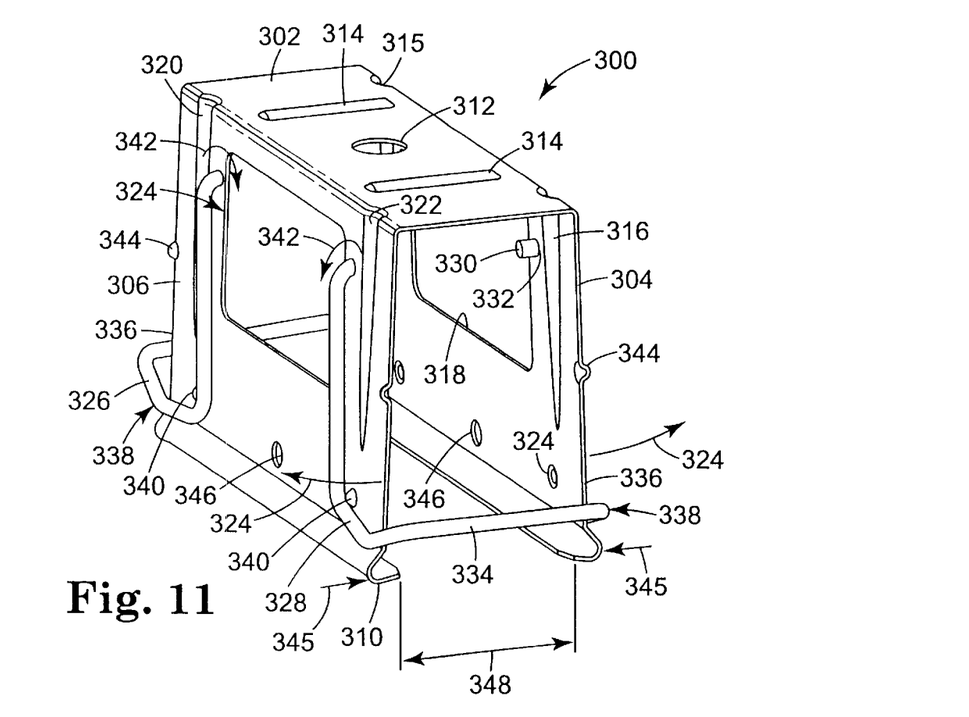
FIG. 11 is a perspective view of an alternate hanger bracket in accordance with the present invention.

FIG. 11 illustrates an alternate hanger bracket 300 in accordance with the present invention. The hanger bracket 300 may be used to suspend any of the light pipes or light sources disclosed herein. The hanger bracket 300 includes a top portion 302 joining first and second side portions 304, 306 in a c-shaped configuration. The hanger bracket 300 permits a snap-fit engagement with upper flanges (for example, upper flanges 20a, 120a, 220a) of the various support rails (for example, support rails 20, 40, 120, 140, 220) disclosed herein. Distal ends of the side portions 304, 306 include unshaped portions 308, 310. In the illustrated embodiment, the unshaped portions 308, 310 curve slightly upward to facilitate engagement with the upper flanges. Other configurations, such as rectangular, circular, etc. can be substituted for the unshaped portions 308, 310.

The hanger bracket 300 may be constructed from a variety of materials, including metal, plastic or composites. In the illustrated embodiment, the hanger bracket 300 is stamped and formed from a sheet of stainless steel.

The top portion 302 includes one or more mounting feature to facilitate attachment to the support surface. In the illustrated embodiment, the mounting feature is mounting hole 312. Upper structural features 314 may optionally be located on the top portion 302 to increase structural integrity. The structural features may be folds, creases, depressions, or other deformations formed in the material comprising the top portion 302. Alternatively, discrete structural features may be attached to the top portion 302 by a variety of methods, such as welding or adhesives.

The side portion 304 includes side structural features 315, 316 located on opposite sides of cut-out 318. Similarly, the side portion 306 includes side structural features 320, 322 located on opposite sides of cut-out 324. The cut-outs 318, 324 serve to lower the weight of the hanger bracket 300 and facilitate handling. The side structural features 315, 316, 320, 322 permit the side portions 304, 306 to be flexed elastically outward in a direction 324 without inelastic deformation of the hanger bracket 300. Flexing the side portions 304, 306 in the direction 324 permits any of the support rails 20, 40, 120, 140, 220 to be snap-fit onto the hanger bracket 300.

Restraining members 326, 328 are located at each end of the hanger bracket 300. The restraining members 326, 328 limit the movement of the side portions 304, 306 in the direction 324. In the illustrated embodiment, the restraining members 326, 328 are u-shaped, wire members with inward curving end portions 330 configured to rotatably engage with holes 332 on the side portions 304, 306. Center portions 334 of the restraining members 326, 328 engage with edges 336 of the side portions 304, 306 in a restrained position 338, as is illustrated in FIG. 11. One or more protrusions 340 may optionally be located on the side portions 304, 306 to hold the restraining members 326, 328 in the restrained position 338. In the restrained position 338, the restraining members 326, 328 establish a maximum separation 348 between the u-shaped portions 308, 310, thereby preventing disengagement from the upper flanges on any of the support rails 20, 40, 120, 140, 220. A pair of opposing holes 346 are optionally provided in the side portions 304, 306 for receiving an additional restraining mechanism, such as the screw clamp 36 illustrated in FIG. 4. In one embodiment, the maximum separation 348 permits the support rails 20, 40, 120, 140, 220 to slide within the hanger bracket 300 relative to the support surface 21 when the length of the light pipe assembly 6 changes due to thermal expansion and contraction. In another embodiment, the restraining members 326, 328 bias the u-shaped portions 308, 310 against the support rails 20, 40, 120, 140, 220 to reduce or eliminate sliding.

The restraining members 326, 328 can be rotated in a direction 342 to an unrestrained position. Protrusions 344 may optionally be located on the side portions 304, 306 to hold the restraining members 326, 328 in the unrestrained position. In the illustrated embodiment, the hanger bracket 300 is attached to the support surface. The restraining members 326, 328 are rotated in the direction 342 and retained in the unrestrained position by the protrusions 344. A support rail is snap-fit or pushed between the side portions 304, 306 so that the upper flanges engage with the u-shaped portions 308, 310. The material forming the hanger bracket 300 and the structural features 315, 316, 320, 322 provide compressive force 345 on the upper flanges sufficient to the light pipe or light source in place temporarily. The restraining members 326, 328 are then rotated in a direction opposite to the direction 342 until the center portion 334 engages the edges 336 of the side portions 304, 306. In the restrained position 338, the restraining mechanisms 326, 328 should now be engaged with the protrusions 340. Finally, an additional restraining mechanism may optionally be inserted through the holes 340.

Figure 12:
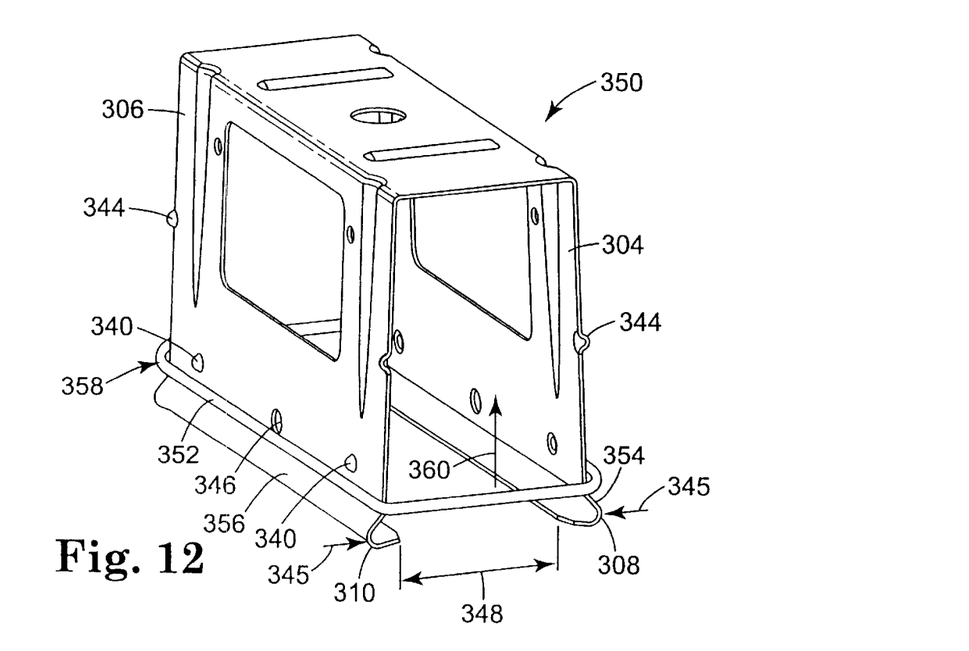
FIG. 12 is a perspective view of a second alternate hanger bracket in accordance with the present invention.

FIG. 12 illustrates a hanger bracket 350 substantially as shown in FIG. 11, except that an alternate restraining member 352 is disclosed. In the illustrated embodiment, the restraining member 352 is a rectangular shaped wire structure that is sized to rest on protrusions 354, 356 formed by the u-shaped portions 308, 310 and to establish the maximum separation 348. The protrusions 340 assist in holding the restraining member 352 in the restrained position 358, illustrated in FIG. 12.

The restraining member 352 can be slide upward in a direction 360 to an unrestrained position. Protrusions 344 may optionally be located on the side portions 304. 306 to hold the restraining member 352 in the unrestrained position. A support rail is snap-fit or pushed between the side portions 304, 306 so that the upper flanges engage with the u-shaped portions 308, 310. The material forming the hanger bracket 300 provides a compressive force 345 on the upper flanges sufficient to hold the light pipe or light source in place temporarily. The restraining member 352 is then advanced in a direction opposite to the direction 360 until it rests on the protrusions 354, 356. In the restrained position 358, the restraining mechanism 352 should now be engaged with the protrusions 340. Finally, an additional restraining mechanism may optionally be inserted through the holes 346.

All patents and patent applications disclosed herein, including those disclosed in the background of the invention are hereby incorporated by reference. While several embodiments of the present invention have now been described, it will be apparent to those of ordinary skill in the art that various changes and modifications may be made without deviating from the inventive concept set forth above. Thus, the scope of the present invention should not be limited to the structures described in this application, but only by the structures described by the language of the claims and the equivalents of those structures.

What is claimed is:

1. A light conduit lighting system, comprising:
   a light source;
   a coupling connect to the light source;
   a light conduit assembly including at least one light conduit connected to the coupling;
   at least one elongate support rail connected to the light source and the light conduit assembly at least one hanger bracket connected to the elongate support rail proximate the light source;
   at least one hanger bracket slidably connected with each support rail proximate the light conduit assembly.

2. A light system mounting assembly as defined in claim 1, wherein the hanger bracket comprises:
   opposing side portions each having end portions that can be flexed apart to permit engagement with the support rail; and
   a restraining member defining a maximum separation between the end portions whereby the support rail is retained by the end portions.

3. A light system mounting assembly as defined in claim 2 wherein the restraining member comprises a wire structure extending around outside surfaces of the side portions.

4. A light system mounting assembly as defined in claim 1 wherein all of the support rails are identical.

5. A light system mounting assembly as defined in claim 1 wherein all of the hanger brackets are identical.

6. A mounting assembly for mounting a lighting system on a support surface, the lighting system including a light source and an elongate light conduit assembly arranged to transport light generally parallel to the support surface and including at least one hollow light conduit connected with said light source for transmitting light, said mounting assembly comprising:
   (a) an elongate support rail connected with the support surface and extending generally parallel to said light conduit assembly;
   (b) a light source hanger bracket connected with the light source and said support rail to allow relative movement between said light source said support surface; and
   (c) at least one light conduit hanger bracket connected with the light conduit assembly and said support rail to allow relative movement between said light conduit assembly and said support surface.

7. A light system mounting assembly as defined in claim 6, wherein the first hanger bracket comprises:
   opposing side portions each having end portions that can be flexed apart to permit engagement with the first support rail; and
   a restraining member defining a maximum separation between the end portions whereby the first support rail is retained by the end portions.

8. A light system mounting assembly as defined in claim 7 wherein the restraining member comprises a wire structure extending around outside surfaces of the side portions.

9. A lighting system mounting assembly as defined in claim 6, wherein said light source hanger bracket is fixedly connected with the support surface and movably connected with said support rail, and further wherein said light conduit hanger bracket is fixedly connected with the support surface and movably connected with said support rail.

10. A lighting system mounting assembly as defined in claim 9, wherein said support rail includes oppositely extending flange portions adapted to slidably engage each of said light source hanger bracket and said light conduit hanger bracket.

11. A lighting system mounting assembly as defined in claim 10, wherein said support rail comprises a light source support rail and a light conduit support rail, wherein said light source hanger bracket is fixedly connected with the support surface and slidably connected with said light source support rail, and said light conduit hanger bracket is fixedly connected with the support surface and slidably connected with said light conduit support rail.

12. A lighting system mounting assembly as defined in claim 11, wherein said light source support rail and said light conduit support rail are rigidly connected.

13. A lighting system mounting assembly as defined in claim 12 and further comprising a housing bracket connecting said light source support rail with said light source.

14. A lighting system mounting assembly as defined in claim 13, wherein said light source hanger bracket is fixedly connected with said housing bracket, and further wherein said housing bracket contains a plurality of aligned holes adapted to receive a fastener, thereby to adjustably secure said light source hanger bracket to said housing bracket.

15. A lighting system mounting assembly as defined in claim 14, wherein said light source hanger bracket includes clamping means for providing a force urging said hanger bracket into engagement with said light source support rail, thereby preventing said hanger bracket from disconnecting from said light source support rail.

16. A lighting system mounting assembly as defined in claim 15, wherein said light source support rail includes stop members arranged to limit the longitudinal extent of travel between said light source support rail relative to said light source hanger bracket.

17. A lighting system mounting assembly as defined in claim 16 wherein the lighting system further includes a load bearing coupling arranged between the light source and the light conduit, thereby providing a force transmitting interface between the light conduit assembly and the light source, whereby forces created during thermal expansion and contraction are transmitted to the light source through said coupling.

18. A lighting system mounting assembly as defined in claim 17, wherein adjacent ends of said coupling and the light conduit include interlocking collars capable of transmitting axial forces to the light source.

19. A lighting system mounting assembly as defined in claim 18, and further comprising a casing connected with said light source support rail, said casing generally enclosing the light source.

20. A lighting system mounting assembly as defined in claim 19, wherein said light source support rail is formed integrally with said casing and further wherein said light source support rail is contained within the length of said casing.

21. A lighting system mounting assembly as defined in claim 6, wherein the lighting system further includes a second light source connected with a second end of the light conduit assembly, said mounting assembly further comprising a support rail connected with the second light source, and a second light source hanger bracket connected with the support surface and the second light source.

22. A lighting system mounting assembly as defined in claim 6, wherein said support rail contains a longitudinal interior channel and said light source hanger bracket includes downwardly extending end portions, and further comprising a stop clip arranged within said longitudinal interior channel, said stop clip having wing portions which extend through said support rail which are adapted to engage said downwardly extending end portions.

23. A light system mounting assembly as defined in claim 12 wherein at least two of the first, second and third support rails are identical.

24. A light system mounting assembly as defined in claim 23 wherein at least two of the first, second and third hanger brackets are identical.

* * * * *

UNITED STATES PATENT AND TRADEMARK OFFICE
CERTIFICATE OF CORRECTION

PATENT NO. : 6,152,578
DATED : November 28, 2000
INVENTOR(S) : Joseph A. Hoffman, DuWayne C. Radke, and Ken J. Hagen It is certified that error appears in the above-identified patent and that said Letters Patent is hereby corrected as shown below:

Column 4,
line 29, "materials" should read -- material, --.

Column 7,
Line 42, "ends of the each leg" should read -- ends of each leg --.

Column 8,
Line 18, "feature" should read -- features --.

Column 9,
Line 28, "slide" should read -- slid --.
Line 56, "assembly at" should read --assembly; ¶at--.

Column 10,
Line 27, "light source said support" should read -- light source and said support --.

Signed and Sealed this

Twenty-fifth Day of September, 2001

*Attest:*

NICHOLAS P. GODICI
*Attesting Officer*     *Acting Director of the United States Patent and Trademark Office*

UNITED STATES PATENT AND TRADEMARK OFFICE
CERTIFICATE OF CORRECTION

PATENT NO. : 6,152,578
DATED : November 28, 2000
INVENTOR(S) : Joseph A. Hoffman, DuWayne C. Radke, and Ken J. Hagen It is certified that error appears in the above-identified patent and that said Letters Patent is hereby corrected as shown below:

Column 4,
Line 29, "materials" should read -- material, --.

Column 7,
Line 42, "ends of the each leg" should read -- ends of each leg --.

Column 8,
Line 18, "feature" should read -- features --.

Column 9,
Line 28, "slide" should read -- slid --.
Line 56, "assembly at" should read -- assembly; ¶at --.

Column 10,
Line 27, "light source said support" should read -- light source and said support --.

Signed and Sealed this

Sixteenth Day of October, 2001

Attest:

*Nicholas P. Godici*

NICHOLAS P. GODICI
*Acting Director of the United States Patent and Trademark Office*

*Attesting Officer*